May 3, 1960  M. D. JENNINGS  2,935,143
TWO-WAY PLOW
Filed June 17, 1957  3 Sheets-Sheet 1

INVENTOR.
Marvin D. Jennings
BY Paul O. Pippel
Atty.

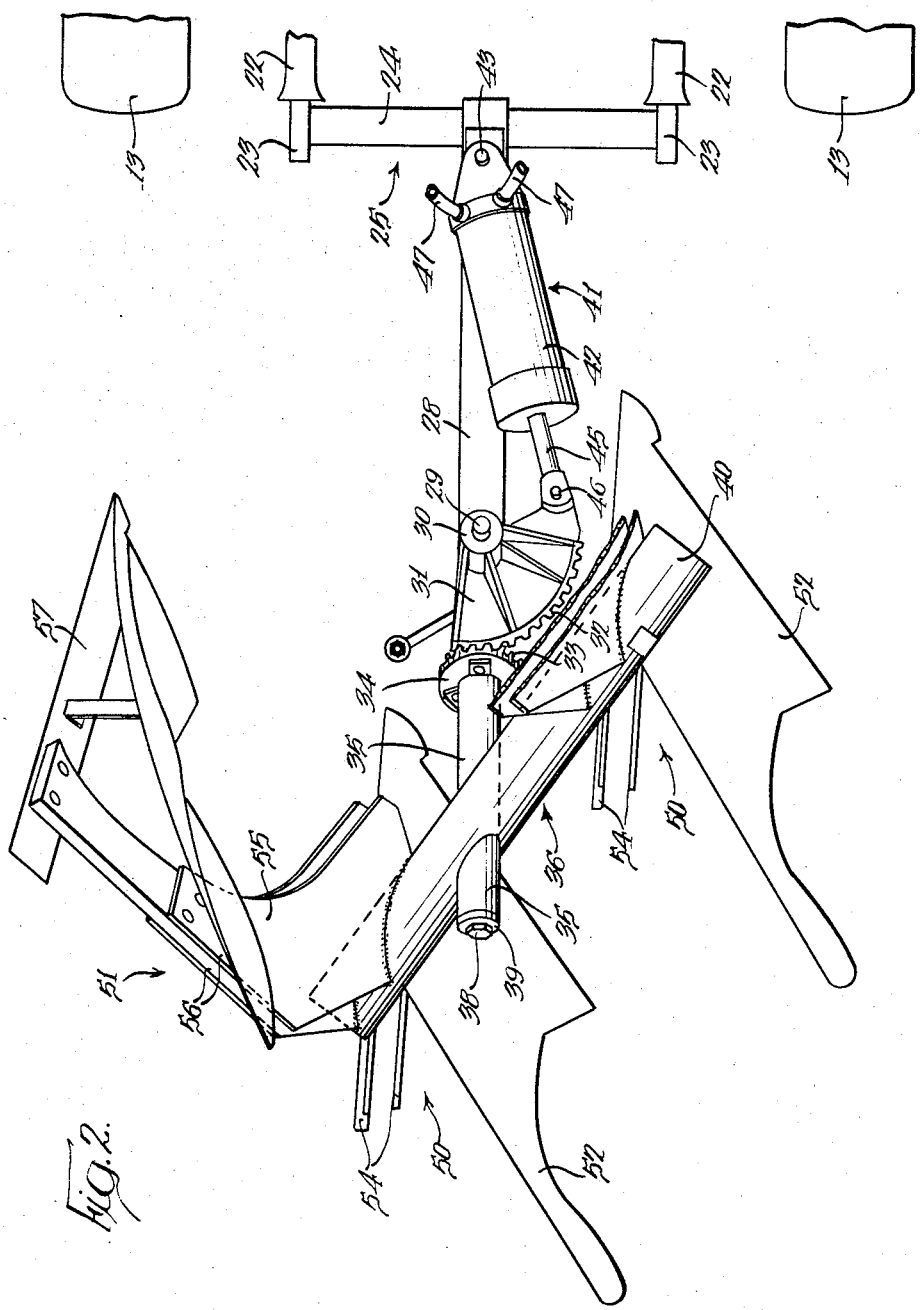

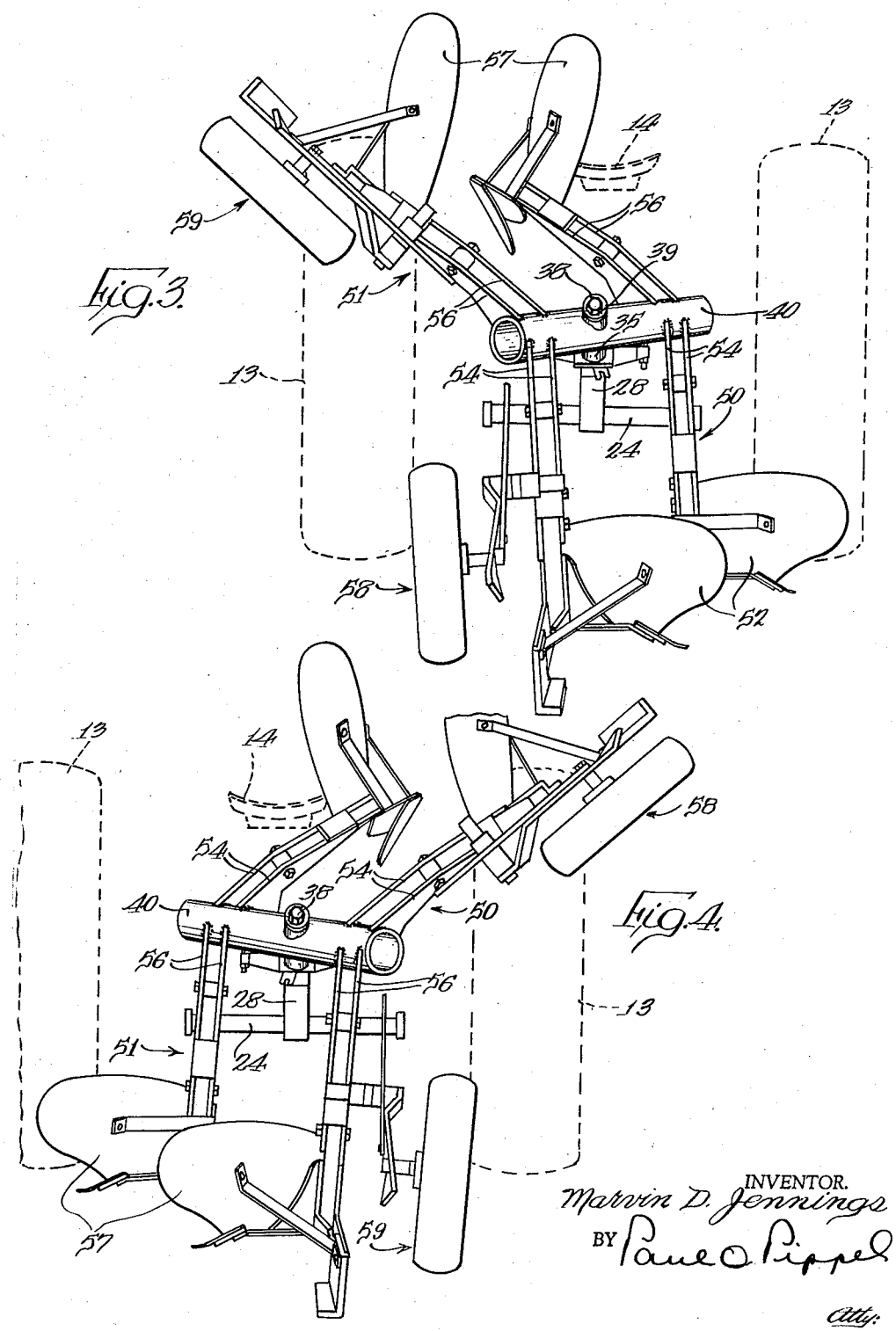

United States Patent Office 2,935,143
Patented May 3, 1960

2,935,143

TWO-WAY PLOW

Marvin D. Jennings, Memphis, Tenn., assignor to International Harvester Company, Chicago, Ill., a corporation of New Jersey Application June 17, 1957, Serial No. 666,033

18 Claims. (Cl. 172—226)

This invention relates to agricultural implements and particularly to two-way plows. More specifically, the invention concerns a two-way plow of the spinner or roll-over type adapted to be mounted upon a tractor to be carried thereby in transport.

In plows, such as moldboard plows, the earth-working plow bottoms are mounted on a frame at longitudinally and laterally spaced locations, and the greater the number of plow bottoms the wider the swath that can be plowed at one traverse of a field. The number of plow bottoms that can be propelled through the ground is dependent on the power of the propelling vehicle, and with the modern trend toward increased tractor horsepower this number is increasing.

In the case of direct connected plows, while the increased tractor power has made it possible to mount on tractors heavier plows having more bottoms, these features have been limited, not by the pulling power of the tractor, but by the rearward overhang of larger implements and the impracticability of transporting the weight thereof upon a tractor.

This problem has been particular acute with respect to plows of the two-way type wherein the provision of each plow bottom adapted for operation in one direction requires the presence on the plow frame of another plow bottom for alternate operation in the other direction, but which is idle until brought into operating position.

A well-known type of two-way plow is one in which alternate operating right and left-hand plow bottoms or elements are disposed 180° apart on a carrying frame mounted for rotation about a horizontal longitudinal axis to place the plow bottoms alternately in operation. In such a plow the idle plow bottom extends in a vertical line directly above the operating plow bottom of the plowing unit. Each set of right and left-hand plow bottoms is longitudinally spaced from the other, and the number of such units that can be mounted on a plow frame at the rear of a tractor depends upon the weight of the implement and the capacity of the tractor to lift and transport it safely and economically.

The present invention contemplates and has for its object the provision of an agricultural implement of unique construction wherein the center of gravity of the implement has been shifted considerably forward of that of conventional implements of the same type, without sacrificing any of the advantages inherent therein.

Another object of the invention is the provision of a tractor-mounted two-way plow of novel construction wherein the center of gravity of the plow has been brought closer to the tractor than has been feasible with previous plows of this type, making it possible to provide more plow bottoms for plowing wider furrows.

Another object of the invention is the provision of an improved tractor-propelled plow of the roll-over type wherein the axis of rotation of the rotatable plow carrier extends upwardly and rearwardly from the tractor at an angle to the horizontal and the alternate right and left-hand plow bottoms are mounted on the carrier on a line substantially perpendicular to said axis of rotation with the idle plow bottom disposed forwardly of the operating plow bottom.

A further object of the invention is the provision of a novel tractor-mounted two-way plow including a main frame and a sub-frame having right and left-hand plowing elements mounted thereon and mounted on the main frame for rotation relative thereto about a rearwardly extending upwardly inclined axis to alternately dispose the plowing elements in operation, wherein the sub-frame is mounted on the main frame diagonally of the direction of travel at an acute angle to the axis of rotation.

Other objects and advantages of the invention will become clear from the following detailed description when read in conjunction with the accompanying drawings, wherein:

Figure 2 is a plan view, with parts removed for clarity, of the structure shown in Figure 1;

Figure 3 is a rear elevation, with parts removed, of the plow of this invention showing the right-hand plow bottoms in operation; and Figure 4 is a view similar to Figure 3 showing the left-hand plow bottoms in operation while the non-operating plow bottoms have been moved to their non-operating position.

Figure 1:
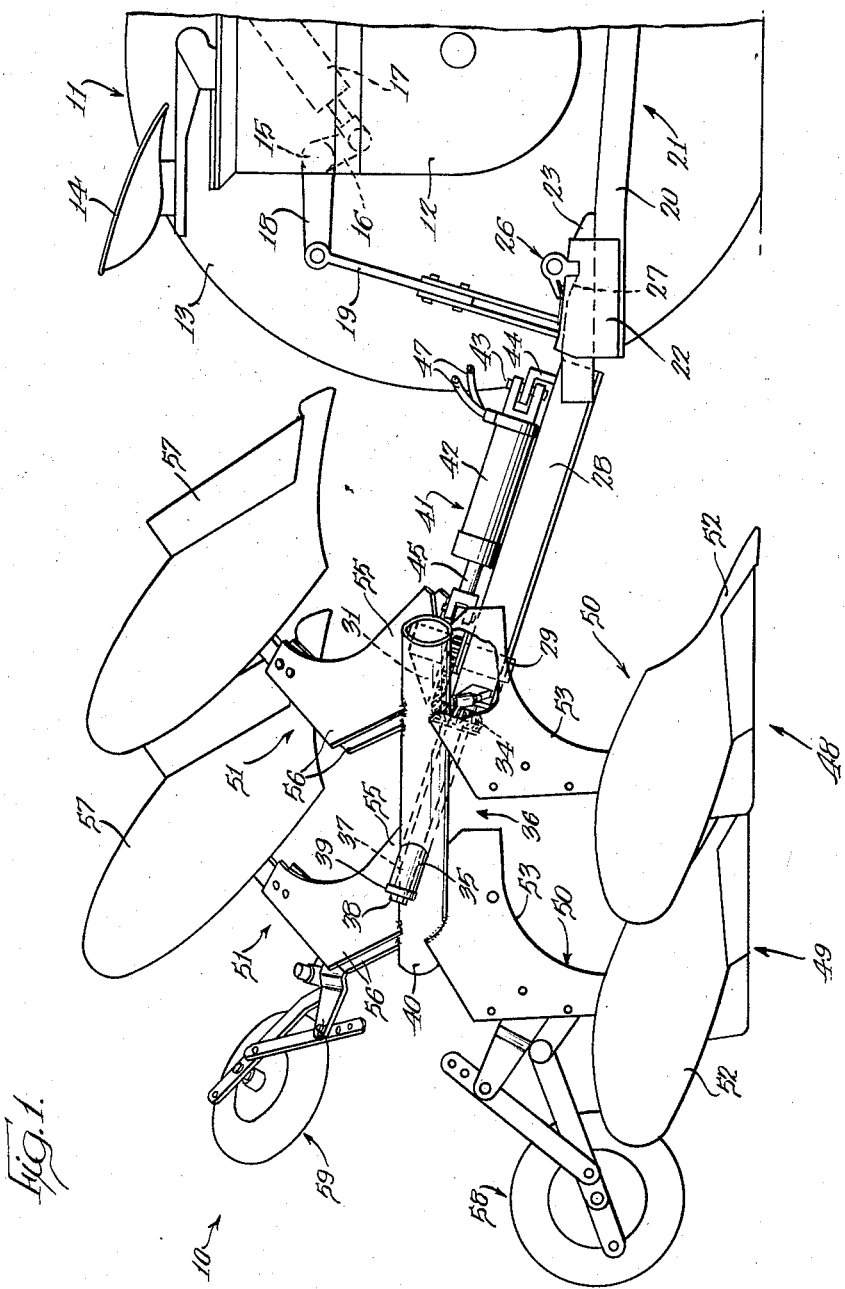
Figure 1 is a view in side elevation showing the rear end of a tractor having mounted thereon a two-way roll-over plow embodying the features of this invention.

The two-way plow of this invention is designated by the numeral 10 and is adapted for mounting upon a tractor 11 of conventional construction comprising a body 12, laterally spaced rear drive wheels 13 and an operator's station 14.

The tractor is provided with power lifting apparatus including a rockshaft 15 having an arm 16 thereon pivotally connected to a hydraulic ram 17 operated by fluid under pressure from a source, not shown, on the tractor. Also mounted upon the rockshaft 15 is a lift arm 18, one of said lift arms being provided on each side of the tractor body and pivotally connected at its end to a vertically extending lift link 19. The lift links 19, connected to the lift arms 18, are connected at their lower ends to the laterally spaced arms 20 of a drawbar structure indicated at 21, which is U-shaped and is connected, in a manner not shown, in draft-receiving relation to the tractor. Actuation of the hydraulic ram 17 swings the lift arms 18 and the drawbar 20 between a lowered and a raised position corresponding to the operating and transport positions of the implement 10.

The structure of the drawbar 20 forms no part of this invention and a detailed description thereof is not indicated. It might be noted that each of the arms 20 is provided at its rear end with an elongated tubular socket member 22 adapted to slidably receive therein an elongated shaft member 23 affixed to the ends of a transverse member 24 forming a part of a main or supporting frame indicated at 25. Each of the socket members 22 carries suitable latching means 26, the construction and operation of which form no part of this invention, adapted for cooperative association with a notch 27 in the shaft 23 to hold the latter against longitudinal displacement from the socket.

Transverse member 24 is affixed to and projects laterally from opposite sides of a longitudinally extending rearwardly and upwardly inclined tubular frame member 28 in the rear end of which is rotatably mounted a spindle 29 upon the upper end of which is secured the hub 30 of a sector 31 having peripheral teeth 32 thereon. The teeth 32 of sector 31 are adapted to engage the teeth 33 of a gear 34 affixed to the bearing portion 35 of a tool carrier, generally designated at 36, mounted upon a rod 37 extending through the elongated bearing portion 35 and secured to the rear end of frame member 28 and coaxial therewith. The rear end of rod 37 is threaded to receive a nut 38 engaging a washer 39 which bears against the rear end of the tubular bearing portion 35. Member 28 serves as a tool-supporting beam which extends rearwardly and upwardly, in the operating position of the two-way plow of this invention, as shown in Figure 1, at an angle with respect to the horizontal of approximately 20°.

Tool carrier 36 also includes an elongated horizontal diagonally extending tubular member 40 which extends at an acute angle to the bearing portion 35 of the carrier and to the axis thereof and of the beam 28.

At this point is should be clear that the carrier 36 is rotatable about the axis of the rod 37 and beam 28. Rotation of the tool carrier is accomplished by swinging the sector 31 about the axis of spindle 29, and by engagement of the teeth 32 thereof with the teeth 33 of gear 34, revolving the tool carrier 36. Swinging of the sector 31 is accomplished by the actuation of a hydraulic ram 41 comprising a cylinder 42 pivotally mounted upon a pin 43 carried by a lug 44 affixed to and projecting upwardly from the forward end of beam 28. A piston rod 45 slidable in the cylinder 42 is pivotally connected by a pin 46 with the sector 31 to rock the latter about its axis upon actuation of the hydraulic ram. Fluid under pressure is supplied to the ram 41 through hose lines 47 from a source on the tractor, not shown. Rotation of the bevel gear 35 revolves the tool carrier 36 about the said axis of rod 37 and beam 28.

The earth-working tools of this invention are a pair of plow units 48 and 49, each of which includes a right-hand plow element 50 and a left-hand plow element 51. Each of the plow elements 50 comprises a right-hand plow bottom 52 mounted upon the lower end of a standard 53, each of which comprises a pair of spaced angularly shaped supporting plates 54 secured as by welding at axially spaced locations to the tubular carrier portion 40 on opposite sides of the bearing portion 35 of the carrier.

In the operating position shown in Figure 1, the right-hand plow elements 50 are in operating position while the left-hand plow elements 51 are in an elevated, nonoperating position. Each of the plow elements 51 comprises a standard 55. Similar to standards 53, and also includes a pair of spaced angularly shaped supporting plates 56 supporting at their lower ends plow bottoms 57.

As shown in the drawings, the tubular carrier member 40 is disposed at an acute angle to the axis of rotatation of the bearing portion 35 of the carrier, and this angle is approximately 38°. Likewise, as shown in the drawings, with the operating plow bottoms in their ground-working position, the plates 54 of the standard 53 of the right-hand plow elements 50 and plates 56 of the left-hand plow elements 51 are substantially parallel to the direction of travel of the plow when the associated plow bottoms are in operating position, as shown in Figures 3 and 4. A gauge wheel assembly 58 is provided for the right-hand plow bottoms 52 and a similar unit 59 is provided for the left-hand plow bottoms 57.

In a conventional roll-over two-way plow of the type herein described, the alternately operating right and left-hand plowing elements lie in a vertical plane, one directly above the other, and the carrier upon which they are mounted is rotatable about a substantially horizontal axis to maintain this position of the plow bottoms when the operating position thereof is reversed.

As pointed out hereinbefore, in a conventionally constructed roll-over two-way plow the number of plow units, and therefore the width of cut of the implement, is limited by the amount of weight that the tractor can safely and economically carry. With the plow of the present invention the addition of plow units is made possible by shifting the center of gravity of the plow closer to the tractor so that it can carry the additional weight. By referring to Figure 1 it will be noted that the non-operating plow elements of each plow unit extend forwardly of the operating elements. This is made possible by the angle assumed by beam 28 and the axis of rotation of tool carrier 36 with respect to the horizontal, as well as the angle of tubular member 40 with respect to the axis of rotation about rod 37, and the disposition of the plates 54 and 56 of the plow standards on the tubular member 40. The included angle between the plow elements of each right and left-hand unit is approximately 115°, and upon rotation of the tool carrier 36 about the axis of the rod 37 from an operating position such as shown in Figure 3 to that of Figure 4, the operating plow elements, in moving to the non-operating position, follow generally an arcuate path in a vertical plane diagonal to the direction of travel of the implement and tractor. This causes the plow elements moving into non-operating position to shift not only forwardly but also laterally of the operating plow units to a position between the operator's station 14 and the adjacent rear drive wheel of the tractor whereby maximum forward shifting of the center of gravity of the plow is achieved without danger of injury to either the tractor operator or the tractor equipment by the plow bottoms.

In operation, the implement is lifted at the end of a field when a turn is made to traverse the field in the opposite direction while plowing adjacent furrows. Upon reaching the end of the field the tractor operator actuates the hydraulic ram 17 to rock the lift arms 18 and raise the drawbar 21 with the implement connected thereto. The operator then introduces fluid under pressure into the cylinder 42 of ram 41 mounted on the implement frame to extend piston rod 45 therein. As shown clearly in Figure 2, actuation of ram 41 to move the piston rod 45 in one direction, rocks the toothed sector 31 about the axis of the spindle 29, and through engagement thereof with the bevel gear 34, rotates the tool carrier 36 about its axis on beam 28. This reverses the positions of the plow bottoms 52 and 57, the plow bottoms being maintained in position by locking the fluid in ram 41. The implement is then lowered, and upon reaching the opposite end of the field the foregoing procedure is reversed. If desired, of course, suitable mechanical latching means operable between the tool carrier 36 and the main frame 25 may be provided to hold the implement in its operating position. Furthermore, where the implement is to be transported any substantial distance the carrier 36 may be revolved until the member 40 is in the same vertical plane as the beam 28 and the plow elements of each unit lie in a horizontal plane above the ground.

The function and operation of the two-way plow of this invention should be clearly understood from the foregoing description. It should likewise be understood, however, that modifications may be made in the invention without departing from the spirit thereof or the scope of the appended claims.

What is claimed is:

1. An agricultural implement comprising a frame generally vertically movable from an operating to a transport position, and an earth-working tool rotatably mounted on the frame on an axis which extends rearwardly and upwardly in the operating position of the tool, and power transmission means operatively connected to said tool for moving it about said axis to a non-operating position.

2. An agricultural implement comprising a traveling support, a tool carrier, and means for mounting the carrier on the support for generally vertical swinging from its operating position in an arcuate path in a vertical plane extending diagonally of the direction of travel of the implement to a non-operating position thereof.

3. A two-way plow adapted for mounting upon a tractor to be transported thereby, comprising a support connected to the tractor to be raised and lowered with respect thereto, a plow carrier having alternately operable right and left-hand plow elements circumferentially spaced thereon, and means for mounting the carrier on the support to swing the operating plow element to a non-operating position in an arc lying substantially in a vertical plane diagonal to the direction of travel of the plow.

4. The invention set forth in claim 3, wherein the carrier is mounted on the support for rotation about an upwardly inclined axis to alternately place the right and left-hand plow elements in operation.

5. The invention set forth in claim 3, wherein the right and left-hand plow elements are circumferentially spaced at an angle greater than 90° and less than 180°.

6. The invention set forth in claim 5, wherein the angle between alternate right and left-hand plow elements is approximately 115°.

7. The invention set forth in claim 4, wherein said axis, when one of the plow elements is in operating position, is upwardly inclined at an angle of approximately 20°.

8. A two-way plow adapted for mounting on a tractor to be transported thereby, comprising a support connected to the tractor to be raised and lowered and including means serving as a generally longitudinal supporting beam extending rearwardly and upwardly, a tool carrier mounted on said beam and rotatable about the axis thereof, right and left-hand plow bottoms mounted on the carrier and circumferentially spaced with respect to said axis, said carrier being rotatable to place one of said plow bottoms in operating position while the other plow bottom is moved to a non-operating position, said non-operating plow bottom being disposed in advance of said operating plow bottom when the latter is in its operating position.

9. A two-way plow adapted for mounting on a tractor to be transported thereby, comprising a support connected to the tractor to be raised and lowered and including means serving as a generally longitudinal supporting beam extending rearwardly and upwardly, a tool carrier mounted on said beam and rotatable about the axis thereof, right and left-hand plow bottoms mounted on the carrier and circumferentially spaced with respect to said axis, the mounting of the plow bottoms upon the carrier and of the carrier upon said beam being such that, upon rotation of the carrier about the axis of said beam to dispose one of said bottoms in operating and the other in non-operating position, the latter plow bottom is disposed forwardly and laterally of the operating plow bottom when the latter is in its operating position.

10. The combination with a tractor having lift means thereon of a two-way plow, comprising a supporting frame operatively connected to said lift means to be raised and lowered thereby, a tool carrier having a pair of circumferentially spaced right and left-hand plow elements thereon, and means mounting said carrier on the supporting frame for swinging about an axis to alternately dispose one of said plow elements in an operating position while the other is elevated to a non-operating position, said mounting means including means independent of said lift means for shifting the operating plow element, during movement thereof to its non-operating position, to a location in advance of the other plow element when the latter is in the operating position.

11. The invention set forth in claim 10, wherein the circumferential spacing between said right and left-hand plow elements is less than 180°.

12. The invention set forth in claim 10, wherein said carrier is an elongated generally horizontal member extending diagonally of the direction of travel of the plow at an acute angle to said axis, and at least two pairs of right and left-hand plow elements are mounted on said member on opposite sides of said axis and circumferentially spaced with respect to said member.

13. The combination with a tractor having lift means thereon, of a two-way plow comprising a supporting frame operatively connected to said lift means to be raised and lowered thereby and including a longitudinally extending beam member having at least a portion thereof inclined upwardly when the plow is in operating position, a carrier having a bearing portion rotatably mounted on said inclined portion of the beam and a plow-carrying portion horizontolly disposed at an acute angle to said beam and having a pair of plow units mounted thereon, each said unit comprising a pair of standards affixed to the carrier at circumferentially spaced locations and having right and left-hand plow bottoms thereon alternately disposable in operating position upon rotation of the carrier about the axis of said beam.

14. The combination with a tractor having lift means thereon, of a two-way plow comprising a supporting frame operatively connected to said lift means to be raised and lowered thereby and including a longitudinally extending beam member having at least a portion thereof inclined upwardly when the plow is in operating position, a carrier having a bearing portion rotatably mounted on said inclined portion of the beam and a plow-carrying portion horizontally disposed at an acute angle to said beam and having a pair of plow units mounted thereon, each said unit comprising a pair of standards affixed to the carrier at circumferentially spaced locations and having right and left-hand plow bottoms thereon alternately disposable in operating position upon rotation of the carrier about the axis of said beam, and power transmission means on the supporting frame operatively connected to said carrier for rotating the latter about the axis of said beam.

15. The invention set forth in claim 13, wherein said inclined portion of the beam is at an angle of approximately 20° to the horizontal and the included angle between the plow bottoms of each said unit is approximately 115°.

16. A two-way plow adapted for connection to a tractor comprising a generally longitudinally extending supporting beam structure, a tool carrier mounted on said beam structure and rotatable about the axis thereof, alternate right and left-hand plow elements including plow bottom carrying standards mounted on said carrier at circumferentially spaced locations with respect to said axis and alternately movable between operating and non-operating positions by rotation of the carrier, the mounting of said standards on the carrier being such that when one of the plow bottoms is in operating position the associated standard is substantially vertical and the non-operating bottom is disposed forwardly of the plow bottom in operating position.

17. The invention set forth in claim 16 wherein, in the operating position the standard carrying the operating plow bottom is disposed substantially vertically and at an angle to the axis of said beam structure.

18. The invention set forth in claim 17 wherein said non-operating plow bottom is disposed forwardly of and spaced laterally from said operating plow bottom.

References Cited in the file of this patent

UNITED STATES PATENTS

| | | |
|---|---|---|
| 536,949 | Fay | Apr. 2, 1895 |
| 1,191,143 | Amiot | July 18, 1916 |
| 1,807,731 | Ehricke | June 2, 1931 |
| 2,716,933 | Smith | Sept. 6, 1955 |

FOREIGN PATENTS

| | | |
|---|---|---|
| 21,879 | France | Oct. 30, 1920 |
| | (Addition to Patent 493,036) | |
| 34,655 | Germany | Apr. 1, 1886 |
| 10,265 | Great Britain | of 1907 |